US011482952B1

United States Patent
Wang et al.

(10) Patent No.: US 11,482,952 B1
(45) Date of Patent: Oct. 25, 2022

(54) METHOD FOR DETERMINING ZERO CROSSING OCCURRENCE IN ALTERNATING CURRENT SIGNAL WITH CONSTANT FREQUENCY OF PERMANENT MAGNET SYNCHRONOUS MOTOR WITH HIGH NOISE IMMUNITY AND LOW DELAY AND ASSOCIATED MOTOR DEVICE

(71) Applicant: Elite Semiconductor Microelectronics Technology Inc., Hsinchu (TW)

(72) Inventors: Shih-Chieh Wang, Hsinchu (TW); Yong-Yi Jhuang, Hsinchu (TW); Ming-Fu Tsai, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 0 days.

(21) Appl. No.: 17/496,747

(22) Filed: Oct. 7, 2021

(51) Int. Cl.
  *H02P 6/00* (2016.01)
  *H02P 6/16* (2016.01)
  *H02P 6/182* (2016.01)

(52) U.S. Cl.
  CPC .......... *H02P 6/182* (2013.01); *H02P 2207/05* (2013.01)

(58) Field of Classification Search
  CPC ...................................................... H02P 6/182
  USPC ................................................... 318/400.35
  See application file for complete search history.

(56) References Cited

U.S. PATENT DOCUMENTS

| 5,245,256 | A | * | 9/1993 | Cassat | ...................... H02P 6/06 388/815 |
| 2011/0156624 | A1 | * | 6/2011 | Takai | ...................... H02P 6/182 318/400.04 |
| 2011/0169442 | A1 | * | 7/2011 | Birumachi | ................ H02P 8/38 318/696 |
| 2012/0161688 | A1 | * | 6/2012 | Tamai | ...................... H02P 1/46 318/721 |
| 2013/0127385 | A1 | | 5/2013 | Allison, III | |

FOREIGN PATENT DOCUMENTS

| TW | 200415844 | | 8/2004 |
| TW | 200922108 | | 5/2009 |
| TW | 201032457 | A1 | 9/2010 |

* cited by examiner

*Primary Examiner* — Erick D Glass
(74) *Attorney, Agent, or Firm* — Winston Hsu

(57) ABSTRACT

A method for determining zero crossing occurrence in an alternating current (AC) signal with constant frequency of a permanent magnet synchronous motor (PMSM) includes: sampling the AC signal to obtain a plurality of data points; starting to count a number of consecutive data points that have sampled values with a same sign in a detection range, to generate a count value, wherein the consecutive data points are included in the plurality of data points; determining whether the count value is equal to a zero crossing determination value; and in response to the count value being equal to the zero crossing determination value, determining that a zero crossing occurs at a last data point of the consecutive data points.

12 Claims, 7 Drawing Sheets

METHOD FOR DETERMINING ZERO CROSSING OCCURRENCE IN ALTERNATING CURRENT SIGNAL WITH CONSTANT FREQUENCY OF PERMANENT MAGNET SYNCHRONOUS MOTOR WITH HIGH NOISE IMMUNITY AND LOW DELAY AND ASSOCIATED MOTOR DEVICE

BACKGROUND OF THE INVENTION

1. Field of the Invention

The present invention is related to a permanent magnet synchronous motor (PMSM), and more particularly, to a method for determining zero crossing occurrence in an alternating current (AC) signal with constant frequency of the PMSM with high noise immunity and low delay and associated motor device.

2. Description of the Prior Art

Generally speaking, for sensorless driving of a PMSM, a rotor position of the PMSM is usually predicted by estimating an AC signal with constant frequency (e.g. aback electromotive force (EMF) signal) of the PMSM. Since the back EMF signal is a signal with sign alternated between positive and negative and is similar to a sine wave, a zero crossing of the back EMF signal is an important trigger signal for reset position estimation. As long as the rotor position can be calibrated according to a time point of the zero crossing when the PMSM is drived, phase change of a stator of the PMSM can be correct.

The back EMF signal of the PMSM is generally estimated by the Kirchhoff's voltage law (KVL), which will introduce not only analog-to-digital converter (ADC) sampling of the motor voltage and current but sampling noise. However, determination of the time point of the zero crossing will be wrong due to the sampling noise. In a typical method for determining zero crossing occurrence in the back EMF signal of the PMSM, for example, a low pass filter is applied to the back EMF signal to filter the sampling noise. However, the occurrence time of the zero crossing will be delayed, and the filtered signal waveform will have a phase lag compared with the original back EMF signal. As a result, an innovative method for determining zero crossing occurrence in the back EMF signal of the PMSM with high noise immunity and low delay is urgently needed.

SUMMARY OF THE INVENTION

It is therefore one of the objectives of the present invention to provide a method for determining zero crossing occurrence in an AC signal with constant frequency of a PMSM and an associated motor device, to address the above-mentioned problems.

According to one embodiment of the present invention, a method for determining zero crossing occurrence in an AC signal with constant frequency of a PMSM is provided. The method may include: sampling the AC signal to obtain a plurality of data points; starting to count a number of consecutive data points that have sampled values with a same sign in a detection range, to generate a count value, wherein the consecutive data points are included in the plurality of data points; determining whether the count value is equal to a zero crossing determination value; and in response to the count value being equal to the zero crossing determination value, determining that a zero crossing occurs at a last data point of the consecutive data points.

According to another embodiment of the present invention, a motor device is provided. The motor device may include a PMSM, a sampling circuit, and a processing circuit. The sampling circuit may be coupled to the PMSM, and arranged to sample an AC signal of the PMSM to obtain a plurality of data points. The processing circuit may be coupled to the sampling circuit, and arranged to: start to count a number of consecutive data points that have sampled values with a same sign in a detection range, to generate a count value, determine whether the count value is equal to a zero crossing determination value, and in response to the count value being equal to the zero crossing determination value, determine that a zero crossing occurs at a last data point of the consecutive data points, wherein the consecutive data points are included in the plurality of data points.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
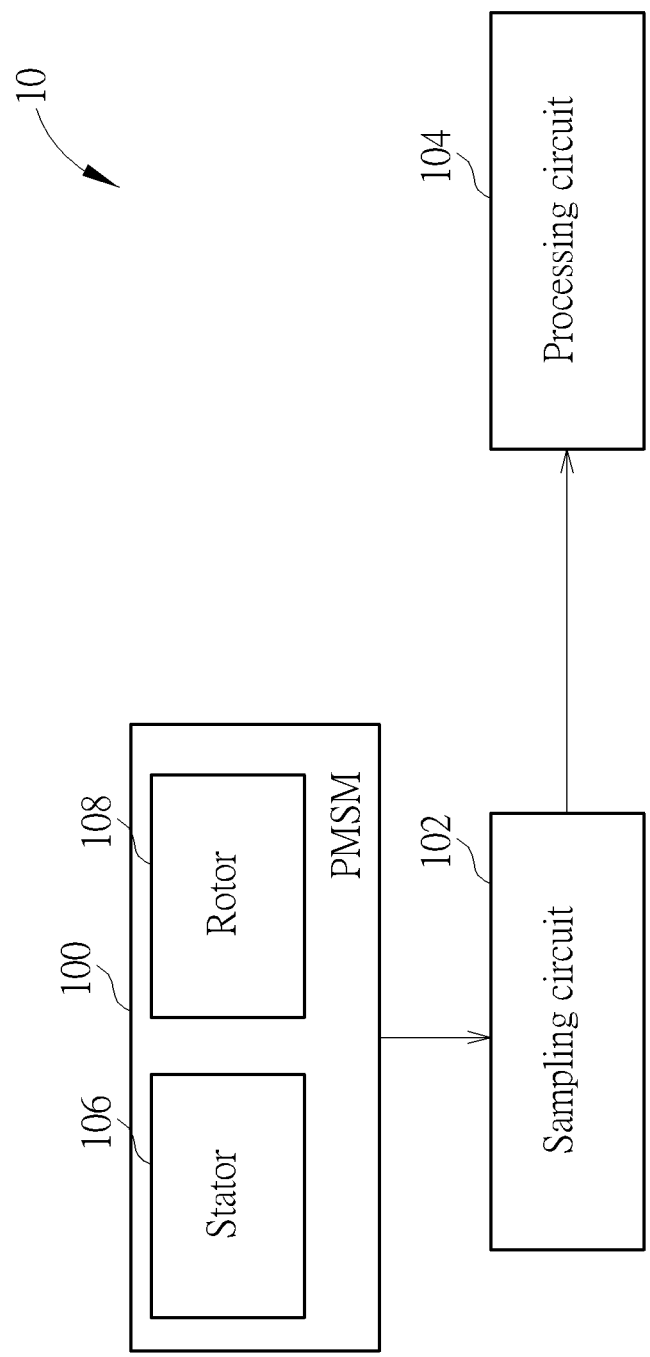
FIG. 1 is a block diagram illustrating a motor device according to an embodiment of the present invention.

FIG. 1 is a block diagram illustrating a motor device 10 according to an embodiment of the present invention. The motor device 10 may include a permanent magnet synchronous motor (PMSM) 100, a sampling circuit 102, and a processing circuit 104, wherein the sampling circuit 102 may be coupled to the PMSM 100, and the processing circuit 104 may be coupled to the sampling circuit 102. The PMSM 100 may include a stator 106 and a rotor 108, wherein the stator 106 may be a three phase stator winding, the rotor 108 may be a permanent magnet, and zero crossing occurrence in a back electromotive force (EMF) signal of one of the three phase stator winding may be arranged to determine position of the rotor 108. In addition, at the time a zero crossing of the back EMF signal occurs, sign of the back EMF signal may be changed from positive to negative through the zero crossing or the sign of the back EMF signal may be changed from negative to positive through the zero crossing. It should be noted that, the zero crossing occurrence in the back EMF signal is only for illustrative purposes, and the present invention is not limited thereto. In practice, the zero crossing occurrence in any other type of an alternating current (AC) signal with constant frequency (e.g. a feedback current signal) of the PMSM 100 will fall within the scope of the present invention.

Figure 2:
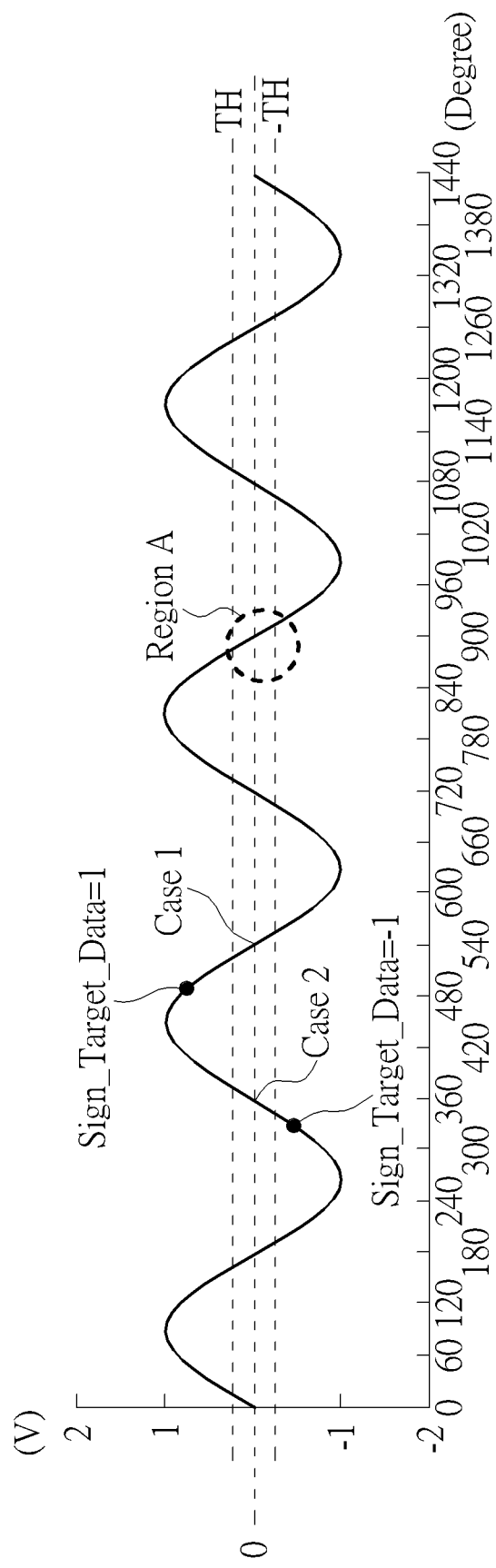
FIG. 2 is a diagram illustrating relationship between a back EMF signal and a rotor position according to an embodiment of the present invention.

FIG. 2 is a diagram illustrating relationship between a back EMF signal and a rotor position according to an embodiment of the present invention. In order to determine zero crossing occurrence in the back EMF signal, the back EMF signal may be sampled by the sampling circuit 102 first, to obtain a plurality of data points. Then, the processing circuit 104 may be arranged to set a threshold value TH to obtain a detection range for the zero crossing occurrence according to the threshold value TH and negative of the threshold value TH (labeled as "−TH" in FIG. 2), wherein the detection range has an upper bound being the threshold value TH and a lower bound being the negative of the threshold value TH. For a data point DP being any of the plurality of data points, an absolute value of a sampled value of the data point DP is compared with the threshold value TH by the processing circuit 104. When the absolute value of the sampled value of the data point DP is not smaller than the threshold value TH, the sampled value of the data point is determined to be not within the detection range.

In response to the sampled value of the data point DP being not within the detection range, the processing circuit 104 may set a sign target data SIGN_TARGET_DATA according to sign of the data point DP, for determining whether consecutive data points that have sampled values with a same sign are in the plurality of data points, wherein the consecutive data points are included in the plurality of data points. For example, when sign of the back EMF signal is going to be changed from positive to negative through the zero crossing and the sign of the data point DP is positive (i.e. the sampled value of the data point DP is not smaller than the threshold value TH), the sign target data SIGN_TARGET_DATA is set as 1 to start to determine whether consecutive data points that have sampled values with negative sign are in the plurality of data points (labeled as "SIGN_TARGET_DATA=1" in FIG. 2). In addition, when the sign of the back EMF signal is going to be changed from negative to positive through the zero crossing and the sign of the data point DP is negative (i.e. the sampled value of the data point DP is not larger than the negative of the threshold value TH), the sign target data SIGN_TARGET_DATA is set as −1 to start to determine whether consecutive data points that have sampled values with positive sign are in the plurality of data points (labeled as "SIGN_TARGET_DATA=−1" in FIG. 2).

On the other hand, in response to the sampled value of the data point DP being within the detection range (i.e. the absolute value of the sampled value of the data point DP is smaller than the threshold value TH), the processing circuit 104 may be further arranged to start to count a number of consecutive data points that have sampled values with a same sign according to the sign target data SIGN_TARGET_DATA, to generate a count value, wherein the count value may include a first count value P_N_CC and a second count value N_P_CC, the first count value P_N_CC is generated by counting the number of consecutive data points with negative sign, and the second count value N_P_CC is generated by counting the number of consecutive data points with positive sign. In addition, the processing circuit 104 may be further arranged to set a zero crossing determination value Nmax and determine whether the count value is equal to the zero crossing determination value Nmax. In response to the count value being equal to the zero crossing determination value Nmax, a zero crossing is determined to occur at a last data point of the consecutive data points.

TABLE 1

| $\omega_m$ (rpm) | S1 | S2 | Nmax |
|---|---|---|---|
| 1000 | 1500 | 8 | 8 |
| 2000 | 750 | 4 | 4 |
| 4000 | 375 | 2 | 2 |
| 6000 | 250 | 1 | 2 |
| 8000 | 188 | 1 | 2 |
| 10000 | 150 | 0 | 2 |
| 20000 | 75 | 0 | 2 |
| 30000 | 50 | 0 | 2 |

Table 1 illustrates an example of relationship between rotational speed $\omega_m$ of the PMSM 100 and the zero crossing determination value Nmax, wherein S1 is the number of sampling points in a 360-degree period, and S2 is the number of sampling points at a 2-degree electrical angle. It is assumed that the PMSM 100 is a 4 pole motor (i.e. P=4), and frequency $f_c$ of pulse-width modulation (PWM) of the PMSM 100 is 50 KHz. The value of S1 may be calculated by dividing 120×$f_c$ by $$P \times \omega_m \left( \text{i.e. } S1 = f_c \times \frac{120}{P \times \omega_m} \right),$$

and the value of S2 may be equal to the largest integer that is less than S1/180. The zero crossing determination value Nmax may be equal to the maximum value between 2 and S2. For example, under the condition that the rotational speed $\omega_m$ of the PMSM 100 is equal to 1000 revolutions per minute (RPM), the value of S1 may be equal to 1500

$$\left( S1 = 50k \times \frac{120}{4 \times 1000} = 1500 \right),$$

and the value of S2 may be equal to 8 (i.e. the largest integer that is less than 1500/180). As a result, the zero crossing determination value Nmax may be equal to 8 (i.e. the maximum value between 2 and 8).

In light of the above, the process of generating the count value (i.e. the first count value P_N_CC and the second count value N_P_CC) may be divided into 2 cases (e.g. case 1 and case 2). In case 1, the sign target data SIGN_TARGET_DATA is determined to be 1 (i.e. the sign of the back EMF signal is changed from positive to negative through the zero crossing). When the sign of the data point DP that has the sampled value being within the detection range is negative (i.e. sign(DP)=−1), the first count value P_N_CC is generated by counting the number of consecutive data points with negative sign. When the sign of the data point DP having the sampled value being within the detection range is positive, the first count value P_N_CC is set as 0 (i.e. when SIGN_TARGET_DATA=1 and sign(DP)=1, P_N_CC=0).

In case 2, the sign target data SIGN_TARGET_DATA is determined to be −1 (i.e. the sign of the back EMF signal is changed from negative to positive through the zero crossing). When the sign of the data point DP that has the sampled value being within the detection range is positive (i.e. sign(DP)=1), the second count value N_P_CC is generated by counting the number of consecutive data points with positive sign. When the sign of the data point having the sampled value being within the detection range is negative, the second count value N_P_CC is set as 0 (i.e. when SIGN_TARGET_DATA=−1 and sign(DP)=−1, N_P_CC=0).

Figure 3:
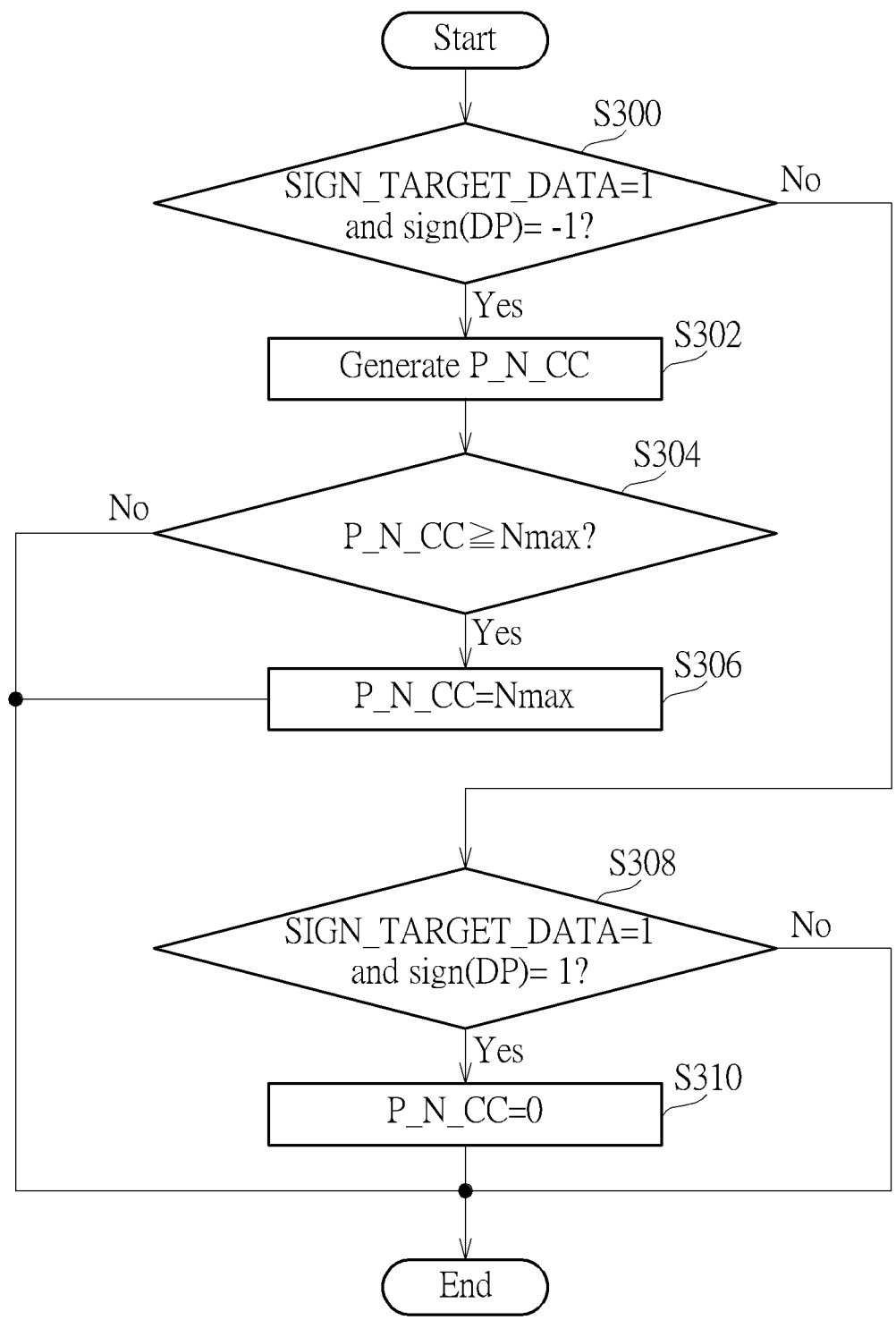
FIG. 3 is a flow chart illustrating the process of generating a count value under case 1 according to an embodiment of the present invention.

FIG. 3 is a flow chart illustrating the process of generating the count value (particularly, the first count value P_N_CC) under case 1 according to an embodiment of the present invention. Provided that the result is substantially the same, the steps are not required to be executed in the exact order shown in FIG. 3. For example, the process of generating the count value under case 1 may be performed and/or controlled by the processing circuit 104 shown in FIG. 1.

In Step S300, it is determined that whether the sign target data SIGN_TARGET_DATA is equal to 1 and the sign of the data point DP that has the sampled value being within the detection range is negative (i.e. sign(DP)=−1). If Yes, Step S302 is entered; if No, Step S308 is entered.

In Step S302, the first count value P_N_CC is generated by counting the number of consecutive data points with negative sign.

In Step S304, it is determined that whether the first count value P_N_CC is larger than or equal to the zero crossing determination value Nmax. If Yes, Step S306 is entered; if No, case 1 ends.

In Step S306, the first count value P_N_CC is set as the zero crossing determination value Nmax (i.e. P_N_CC=Nmax).

In Step S308, it is determined that whether the sign target data SIGN_TARGET_DATA is equal to 1 and the sign of the data point DP that has the sampled value being within the detection range is positive (i.e. sign(DP)=1). If Yes, Step S310 is entered; if No, case 1 ends.

In Step S310, the first count value P_N_CC is set as 0 (i.e. P_N_CC=0).

Figure 4:
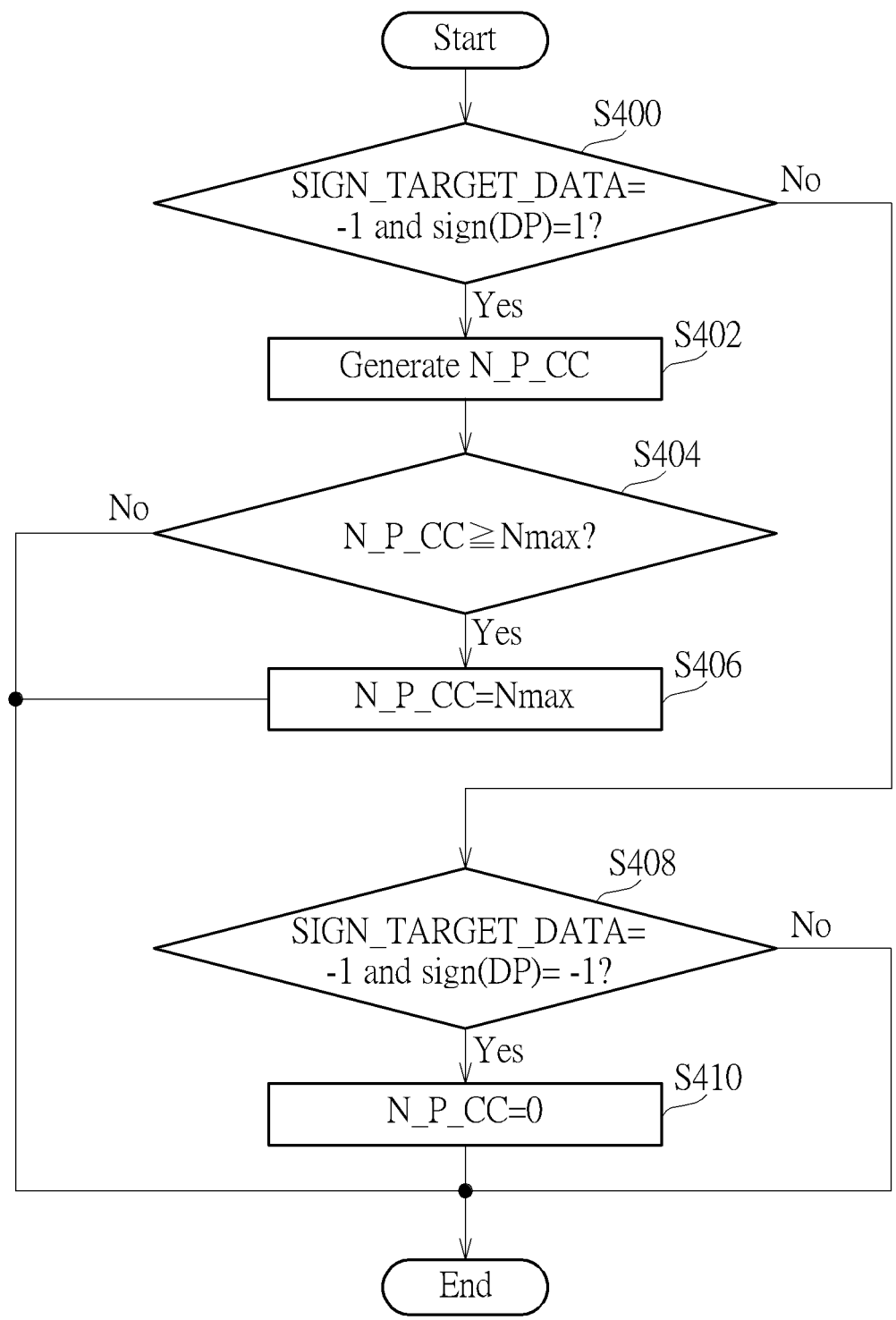
FIG. 4 is a flow chart illustrating the process of generating a count value under case 2 according to an embodiment of the present invention.

FIG. 4 is a flow chart illustrating the process of generating the count value (particularly, the second count value N_P_CC) under case 2 according to an embodiment of the present invention. Provided that the result is substantially the same, the steps are not required to be executed in the exact order shown in FIG. 4. For example, the process of generating the count value under case 2 may be performed and/or controlled by the processing circuit 104 shown in FIG. 1.

In Step S400, it is determined that whether the sign target data SIGN_TARGET_DATA is equal to −1 and the sign of the data point DP that has the sampled value being within the detection range is positive (i.e. sign(DP)=1). If Yes, Step S402 is entered; if No, Step S408 is entered.

In Step S402, the second count value N_P_CC is generated by counting the number of consecutive data points with positive sign.

In Step S404, it is determined that whether the second count value N_P_CC is larger than or equal to the zero crossing determination value Nmax. If Yes, Step S406 is entered; if No, case 2 ends.

In Step S406, the second count value N_P_CC is set as the zero crossing determination value Nmax (i.e. N_P_CC=Nmax).

In Step S408, it is determined that whether the sign target data SIGN_TARGET_DATA is equal to −1 and the sign of the data point DP that has the sampled value being within the detection range is negative (i.e. sign(DP)=−1). If Yes, Step S410 is entered; if No, case 2 ends.

In Step S410, the second count value N_P_CC is set as 0 (i.e. N_P_CC=0).

Figure 5:
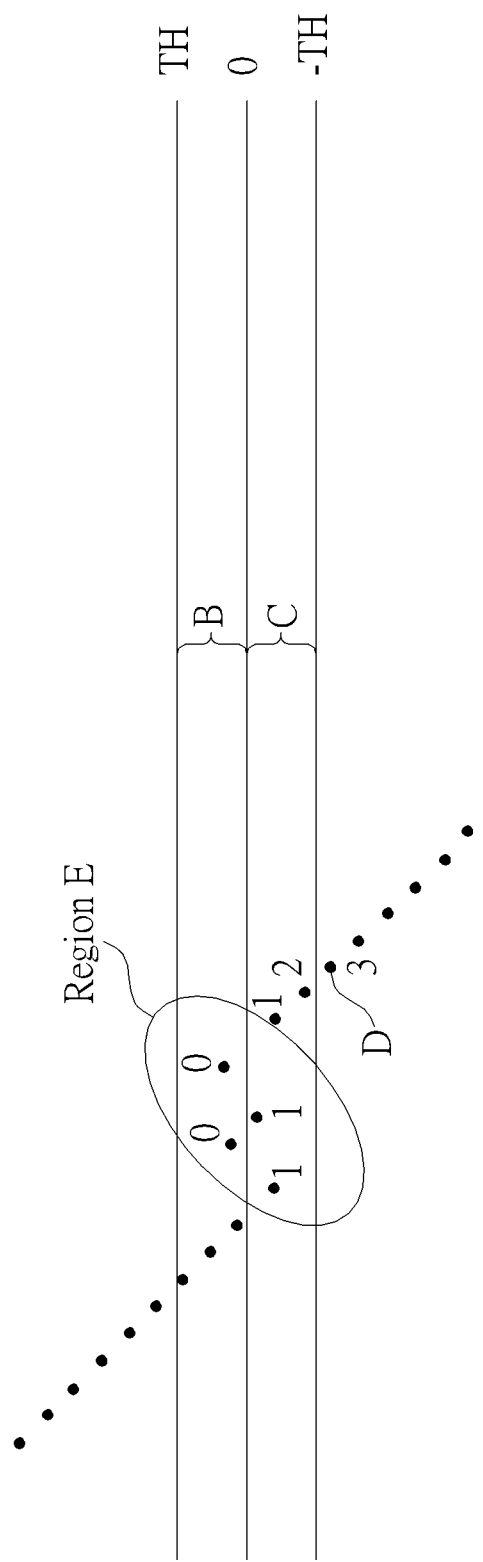
FIG. 5 is a diagram illustrating data points in a region A of the back EMF signal shown in FIG. 2 according to an embodiment of the present invention.

For better comprehension, a region A of the back EMF signal shown in FIG. 2 is enlarged to illustrate determination of zero crossing occurrence at the last data point of the consecutive data points. FIG. 5 is a diagram illustrating data points in the region A of the back EMF signal shown in FIG. 2 according to an embodiment of the present invention. Since the sign of the back EMF signal is changed from positive to negative through the zero crossing in the region A, the count value is generated under case 1 and the sign target data SIGN_TARGET_DATA is equal to 1. In this embodiment, it is assumed that the zero crossing determination value Nmax is set as 3. In a first interval B that is larger than 0 and smaller than the threshold value TH, since the sign of data points is positive, the first count value P_N_CC is set as 0. In a second interval C that is larger than the negative of the threshold value TH and smaller than 0, the first count value P_N_CC is generated by counting the number of consecutive data points with negative sign. Since the zero crossing determination value Nmax is set as 3, the zero crossing is determined to occur at a data point D of the consecutive data points (i.e. the last data point of the consecutive data points when the first count value P_N_CC is equal to the zero crossing determination value Nmax). In addition, data points with sign alternated between positive and negative in a region E before the data point D will be regarded as sampling noise.

Figure 6:
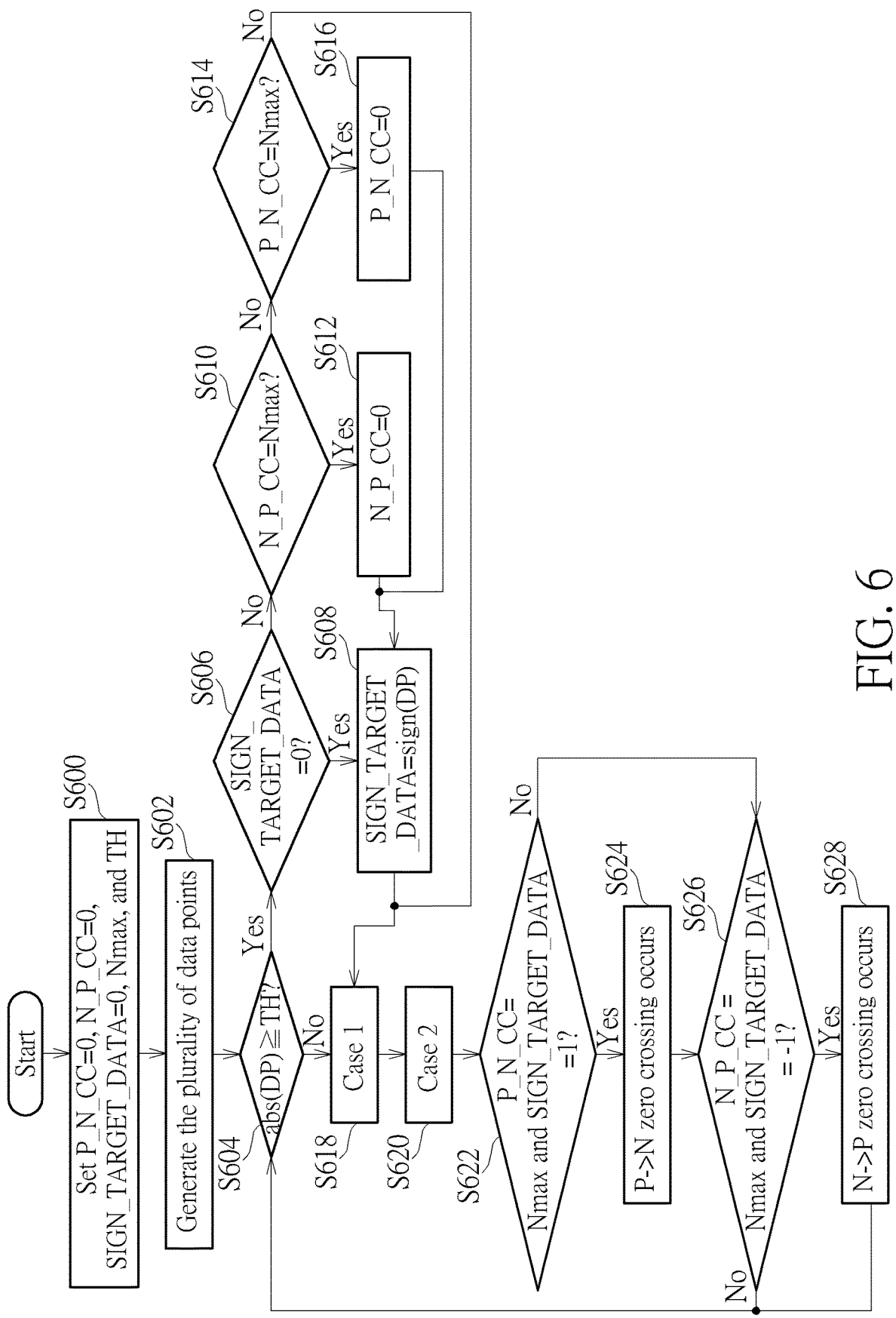
FIG. 6 is a flow chart illustrating a method for determining zero crossing occurrence in a back EMF signal of a PMSM according to an embodiment of the present invention.

FIG. 6 is a flow chart illustrating a method for determining zero crossing occurrence in the back EMF signal of the PMSM according to an embodiment of the present invention. Provided that the result is substantially the same, the steps are not required to be executed in the exact order shown in FIG. 6. For example, the method shown in FIG. 6 may be employed by the PMSM 100. Specifically, the method shown in FIG. 6 may be performed and/or controlled by the sampling circuit 102 and the processing circuit 104 shown in FIG. 1.

In Step S600, the first count value P_N_CC, the second count value N_P_CC, and the sign target data SIGN_TARGET_DATA are set as 0, and the zero crossing determination value Nmax and the threshold value TH are set to determine zero crossing occurrence in the back EMF signal of the PMSM 100.

In Step S602, the back EMF signal is sampled by the sampling circuit 102, to generate the plurality of data points.

In Step S604, for the data point DP being any of the plurality of data points, it is determined whether an absolute value (for brevity, labeled as "abs (DP)") of a sampled value of the data point DP is larger than or equal to the threshold value TH. If Yes, Step S606 is entered; if No, Step S618 is entered.

In Step S606, it is determined that whether the sign target data SIGN_TARGET_DATA is equal to 0. If Yes, Step S608 is entered; if No, Step S610 is entered.

In Step 608, the sign target data SIGN_TARGET_DATA is set as 1 or −1 according to the sign of the data point DP (i.e. SIGN_TARGET_DATA=sign(DP)). When the sign of the back EMF signal is changed from positive to negative through the zero crossing and the sign of the data point DP is positive (i.e. sign(DP)=1), the sign target data SIGN_TARGET_DATA is set as 1. On the other hand, when the sign of the back EMF signal is changed from negative to positive through the zero crossing and the sign of the data point is negative (i.e. sign(DP)=−1), the sign target data SIGN_TARGET_DATA is set as −1.

In Step S610, it is determined whether the second count value N_P_CC is equal to the zero crossing determination value Nmax. If Yes, Step S612 is entered; if No, Step S614 is entered.

In Step S612, the second count value N_P_CC is set as 0.

In Step S614, it is determined whether the first count value P_N_CC is equal to the zero crossing determination value Nmax. If Yes, Step S616 is entered; if No, Step S618 is entered.

In Step S616, the first count value P_N_CC is set as 0.

In Step S618, the process of generating the first count value P_N_CC under case 1 shown in FIG. 3 is performed.

In Step S620, the process of generating the second count value N_P_CC under case 2 shown in FIG. 4 is performed.

In Step S622, it is determined that whether the first count value P_N_CC is equal to the zero crossing determination value Nmax and the sign target data SIGN_TARGET_DATA is equal to 1. If Yes, Step S624 is entered; if No, Step S626 is entered.

In Step S624, it is determined that a zero crossing occurs at the last data point of the consecutive data points, wherein the sign of the back EMF signal is changed from positive to negative through the zero crossing (for brevity, labeled as "P→N zero crossing").

In Step S626, it is determined that whether the second count value N_P_CC is equal to the zero crossing determination value Nmax and the sign target data SIGN_TARGET_DATA is equal to −1. If Yes, Step S628 is entered; if No, Step S604 is returned.

In Step S628, it is determined that a zero crossing occurs at the last data point of the consecutive data points, wherein the sign of the back EMF signal is changed from negative to positive through the zero crossing (for brevity, labeled as "N→P zero crossing").

Since a person skilled in the pertinent art can readily understand details of the steps after reading above paragraphs, further description is omitted here for brevity.

Figure 7:
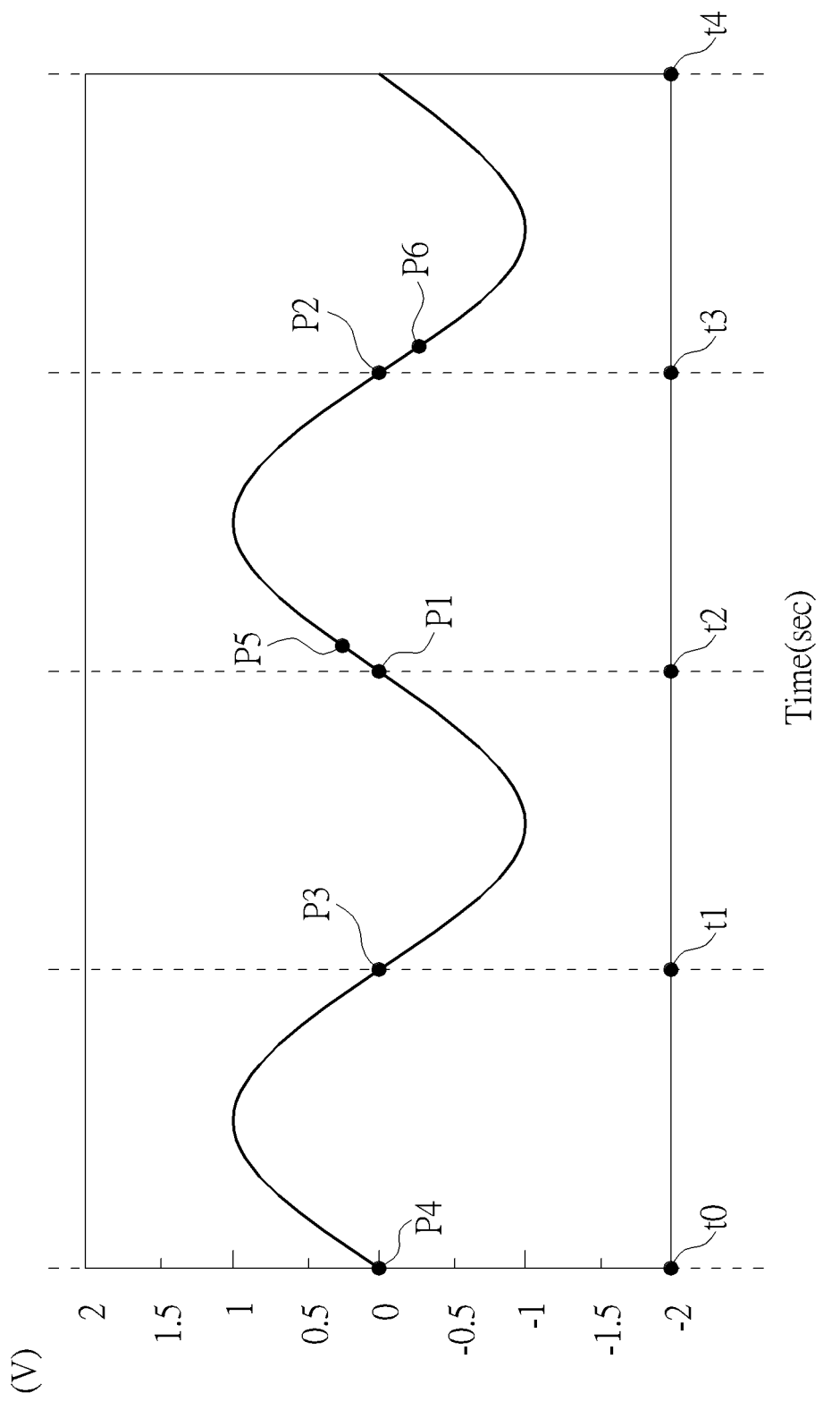
FIG. 7 is a diagram illustrating a back EMF signal according to an embodiment of the present invention.

In addition, in order to avoid the interference of sampling noise and reject the sampling noise, the determination of zero crossing occurrence may be further limited by rotational speed according to the method of the present invention. FIG. 7 is a diagram illustrating a back EMF signal according to an embodiment of the present invention. As shown in FIG. 7, a first zero crossing P1 occurs at a time point t2, a second zero crossing P2 occurs at a time point t3, a third zero crossing P3 occurs at a time point t1, and a fourth zero crossing P4 occurs at a time point t0, wherein the sign of the back EMF signal is changed from negative to positive through the first zero crossing P1 and the fourth zero crossing P4, and the sign of the back EMF signal is changed from positive to negative through the second zero crossing P2 and the third zero crossing P3.

After a zero crossing in the back EMF signal is obtained by the method shown in FIG. 6, two limit rotational speeds are calculated first according to a time difference between two adjacent zero crossings prior to the zero crossing, respectively. For example, for a fifth zero crossing P5 that is obtained by the method shown in FIG. 6 (through which the sign of the back EMF signal is changed from negative to positive), since the rotational speed of the back EMF signal may be calculated by a time difference of any two zero crossings, a first limit rotational speed $\omega_{e1}$ and a second limit rotational speed $\omega_{e2}$ are calculated by the processing circuit 104 according to equations as below:

$$\omega_{e1} = \frac{\pi}{t_2 - t_1}$$

$$\omega_{e2} = \frac{2\pi}{t_2 - t_0}$$

wherein the first limit rotational speed $\omega_{e1}$ is calculated by dividing $\pi$ by a time difference between the time point t2 corresponding to the first zero crossing P1 and the time point t1 corresponding to the third zero crossing P3 (i.e. the first limit rotational speed $\omega_{e1}$ is calculated by half time period at the first zero crossing P1), and the second limit rotational speed $\omega_{e2}$ is calculated by dividing $2\pi$ by a time difference between the time point t2 corresponding to the first zero crossing P1 and the time point t0 corresponding to the fourth zero crossing P4 (i.e. the second limit rotational speed $\omega_{e2}$ is calculated by full time period at the first zero crossing P1).

Similarly, for a sixth zero crossing P6 that is obtained by the method shown in FIG. 6 (through which the sign of the back EMF signal is changed from positive to negative), a third limit rotational speed $\omega_{e3}$ and a fourth limit rotational speed $\omega_{e4}$ are calculated by the processing circuit 104 according to equations as below:

$$\omega_{e3} = \frac{\pi}{t_3 - t_2}$$

$$\omega_{e4} = \frac{2\pi}{t_3 - t_1}$$

wherein the third limit rotational speed $\omega_{e3}$ is calculated by dividing $\pi$ by a time difference between the time point t3 corresponding to the second zero crossing P2 and the time point t2 corresponding to the first zero crossing P1 (i.e. the third limit rotational speed $\omega_{e3}$ is calculated by half time period at the second zero crossing P2), and the fourth limit rotational speed $\omega_{e4}$ is calculated by dividing $2\pi$ by a time difference between the time point t3 corresponding to the second zero crossing P2 and the time point t1 corresponding to the third zero crossing P3 (i.e. the fourth limit rotational speed $\omega_{e4}$ is calculated by full time period at the second zero crossing P2).

In this embodiment, a first rotational speed constant Check1PILimit and a second rotational speed constant Check2PILimit may be set according to rotor inertia by the processing circuit 104, wherein the first rotational speed constant Check1PILimit may be different from the second rotational speed constant Check2PILimit, and values of both of the first rotational speed constant Check1PILimit and the second rotational speed constant Check2PILimit may be set between 0.3 to 0.5 for a light rotor inertia, and may be set between 0.5 to 0.7 for a heavy rotor inertia. In addition, the process of limiting determination of zero crossing occurrence by rotational speed may be divided into 2 cases (e.g. case A and case B).

In case A, the sign of the back EMF signal is changed from negative to positive through the zero crossing determined by the method shown in FIG. 6 (e.g. the fifth zero crossing P5 shown in FIG. 7). For limiting the fifth zero crossing P5 by rotational speed, two rotational speed limit settings (e.g. a first rotational speed limit setting FRS and a second rotational speed limit setting SRS) may be calculated according to the first limit rotational speed $\omega_{e1}$, the second limit rotational speed $\omega_{e2}$, the first rotational speed constant Check1PILimit, and the second rotational speed constant Check2PILimit, wherein the first rotational speed limit setting FRS may be calculated by multiplying the first rotational speed constant Check1PILimit and the first limit rotational speed $\omega_{e1}$ (i.e. FRS=Check1PILimit×$\omega_{e1}$), and the second rotational speed limit setting SRS may be calculated by multiplying the second rotational speed constant Check2PILimit and the second limit rotational speed $\omega_{e2}$ (i.e. SRS=Check2PILimit×$\omega_{e2}$).

For determining whether the fifth zero crossing P5 is a valid zero crossing, a first rotational speed $\omega_{eh}$ calculated by half time period at the fifth zero crossing P5 is compared with the first rotational speed limit setting FRS and a second rotational speed $\omega_{ef}$ calculated by full time period at the fifth zero crossing P5 is compared with the second rotational speed limit setting SRS. In response to the first rotational speed $\omega_{eh}$ being larger than or equal to the first rotational speed limit setting FRS and the second rotational speed $\omega_{ef}$ being larger than or equal to the second rotational speed limit setting SRS (i.e. $\omega_{eh} \geq \text{Check1PILimit} \times \omega_{e1}$ and $\omega_{ef} \geq \text{Check2PILimit} \times \omega_{e2}$), the fifth zero crossing P5 may be determined to be a valid zero crossing. In other words, in response to the first rotational speed $\omega_{eh}$ being smaller than the first rotational speed limit setting FRS or the second rotational speed $\omega_{ef}$ being smaller than the second rotational speed limit setting SRS (i.e. $\omega_{eh} < \text{Check1PILimit} \times \omega_{e1}$ or $\omega_{ef} < \text{Check2PILimit} \times \omega_{e2}$), the fifth zero crossing P5 may not be qualified as a valid zero crossing and may be regarded as the sampling noise.

In case B, the sign of the back EMF signal is changed from positive to negative through the zero crossing determined by the method shown in FIG. 6 (e.g. the sixth zero crossing P6 shown in FIG. 7). For limiting the sixth zero crossing P6 by rotational speed, two rotational speed limit settings (e.g. a third rotational speed limit setting TRS and a fourth rotational speed limit setting QRS) may be calculated according to the third limit rotational speed $\omega_{e3}$, the fourth limit rotational speed $\omega_{e4}$, the first rotational speed constant Check1PILimit, and the second rotational speed constant Check2PILimit, wherein the third rotational speed limit setting TRS may be calculated by multiplying the first rotational speed constant Check1PILimit and the third limit rotational speed $\omega_{e3}$ (i.e. TRS=Check1PILimit×$\omega_{e3}$), and the fourth rotational speed limit setting QRS may be calculated by multiplying the second rotational speed constant Check2PILimit and the fourth limit rotational speed $\omega_{e4}$ (i.e. FRS=Check2PILimit×$\omega_{e4}$).

For determining whether the sixth zero crossing P6 is a valid zero crossing, the first rotational speed $\omega_{eh}$ calculated by half time period at the sixth zero crossing P6 is compared with the third rotational speed limit setting TRS, and the second rotational speed $\omega_{ef}$ calculated by full time period at the sixth zero crossing P6 is compared with the fourth rotational speed limit setting QRS. In response to the first rotational speed $\omega_{eh}$ being larger than or equal to the third rotational speed limit setting TRS and the second rotational speed $\omega_{ef}$ being larger than or equal to the fourth rotational speed limit setting QRS (i.e. $\omega_{eh} \geq \text{Check1PILimit} \times \omega_{e3}$ and $\omega_{ef} \geq \text{Check2PILimit} \times \omega_{e4}$), the sixth zero crossing P6 may be determined to be a valid zero crossing. In other words, in response to the first rotational speed $\omega_{eh}$ being smaller than the third rotational speed limit setting TRS or the second rotational speed $\omega_{ef}$ being smaller than the fourth rotational speed limit setting QRS (i.e. $\omega_{eh} < \text{Check1PILimit} \times \omega_{e3}$ or $\omega_{ef} < \text{Check2PILimit} \times \omega_{e4}$), the sixth zero crossing P6 may not be qualified as a valid zero crossing and may be regarded as the sampling noise.

After a comparison result between the rotational speeds (i.e. the first rotational speed $\omega_{eh}$ and the second rotational speed $\omega_{ef}$) of the zero crossing obtained by the method shown in FIG. 6 and the rotational speed limit settings calculated in case A and case B is generated, if the zero crossing is determined to be the sampling noise according to the comparison result, the processing circuit 104 may be further arranged to reject the sampling noise. In addition, as long as the zero crossing determination value Nmax is not too large, the phase lag between the back EMF signal obtained by the method of the present invention and the original back EMF signal is not obvious. As a result, the zero crossing occurrence in the back EMF signal of the PMSM 100 may be determined with high noise immunity and low delay by the method of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining zero crossing occurrence in an alternating current (AC) signal with constant frequency of a permanent magnet synchronous motor (PMSM) comprising:
    sampling the AC signal to obtain a plurality of data points;
    starting to count a number of consecutive data points that have sampled values with a same sign in a detection range, to generate a count value, wherein the consecutive data points are included in the plurality of data points;
    determining whether the count value is substantially equal to a zero crossing determination value; and
    in response to the count value being substantially equal to the zero crossing determination value, determining that a zero crossing occurs at a last data point of the consecutive data points.

2. The method of claim 1, further comprising:
    for a data point being any of the plurality of data points, determining whether a sampled value of the data point is not within the detection range; and
    in response to the sampled value of the data point being not within the detection range, setting a sign target data by sign of the data point;
    wherein sign of each of the consecutive data points is different from the sign target data.

3. The method of claim 2, wherein determining whether the sampled value of the data point is not within the detection range comprises:
    comparing an absolute value of the sampled value of the data point with a threshold value; and
    in response to the absolute value being not smaller than the threshold value, determining that the sampled value of the data point is not within the detection range.

4. The method of claim 2, wherein the detection range has an upper bound being a positive value and a lower bound being a negative value, the sampled value of the data point is not smaller than the upper bound of the detection range, and the count value is generated by counting the number of consecutive data points with negative sign.

5. The method of claim 2, wherein the detection range has an upper bound being a positive value and a lower bound being a negative value, the sampled value of the data point is not larger than the lower bound of the detection range, and the count value is generated by counting the number of consecutive data points with positive sign.

6. The method of claim 1, wherein determining that the zero crossing occurs at the last data point of the consecutive data points comprises:
    calculating a first limit rotational speed and a second limit rotational speed according to two adjacent zero crossings prior to the zero crossing, respectively;
    calculating a threshold setting according to the first limit rotational speed and the second limit rotational speed;
    comparing a first rotational speed calculated by half time period and a second rotational speed calculated by full time period at the last data point of the consecutive data points with the threshold setting, respectively, to generate a comparison result; and determining that the zero crossing occurs at the last data point of the consecutive data points according to the comparison result.

7. The method of claim 6, wherein the first limit rotational speed is calculated according to a time difference between the two adjacent zero crossings, where one of the two adjacent zero crossings corresponds to the sign of the AC signal changed from negative to positive and another of the two adjacent zero crossings corresponds to the sign of the AC signal changed from positive to negative.

8. The method of claim 6, wherein sign of the AC signal is changed from positive to negative through the zero crossing; the second limit rotational speed is calculated according to a time difference between the two adjacent zero crossings, where each of the two adjacent zero crossings corresponds to the sign of the AC signal changed from positive to negative.

9. The method of claim 6, wherein sign of the AC signal is changed from negative to positive through the zero crossing; the second limit rotational speed is calculated according to a time difference between the two adjacent zero crossings, where each of the two adjacent zero crossings corresponds to the sign of the AC signal changed from negative to positive.

10. The method of claim 6, wherein the threshold setting comprises a first rotational speed limit setting and a second rotational speed limit setting, the first rotational speed limit setting is calculated by multiplying a first rotational speed constant and the first limit rotational speed, and the second rotational speed limit setting is calculated by multiplying a second rotational speed constant and the second limit rotational speed.

11. The method of claim 10, wherein in response to the first rotational speed being larger than or substantially equal to the first rotational speed limit setting and the second rotational speed being larger than or substantially equal to the second rotational speed limit setting, the zero crossing is determined to occur at the last data point of the consecutive data points.

12. A motor device comprising:
a permanent magnet synchronous motor (PMSM);
a sampling circuit, coupled to the PMSM, and arranged to sample an alternating current (AC) signal with constant frequency of the PMSM to obtain a plurality of data points; and
a processing circuit, coupled to the sampling circuit, and arranged to:
start to count a number of consecutive data points that have sampled values with a same sign in a detection range, to generate a count value, wherein the consecutive data points are included in the plurality of data points;
determine whether the count value is substantially equal to a zero crossing determination value; and
in response to the count value being substantially equal to the zero crossing determination value, determine that a zero crossing occurs at a last data point of the consecutive data points.

* * * * *